US008388157B2

(12) United States Patent
Tatehata et al.

(10) Patent No.: US 8,388,157 B2
(45) Date of Patent: Mar. 5, 2013

(54) LIGHT GUIDE SHEET AND MOVABLE CONTACT ASSEMBLY INCLUDING THE SAME

(75) Inventors: Naoki Tatehata, Kyoto (JP); Nobuhisa Takahashi, Okayama (JP); Masahiro Ito, Okayama (JP); Makoto Sadakane, Okayama (JP); Shinji Ohkawa, Okayama (JP)

(73) Assignee: Panasonic Corporation, Osaka (JP)

( * ) Notice: Subject to any disclaimer, the term of this patent is extended or adjusted under 35 U.S.C. 154(b) by 318 days.

(21) Appl. No.: 12/506,585

(22) Filed: Jul. 21, 2009

(65) Prior Publication Data
US 2010/0020567 A1 Jan. 28, 2010

(30) Foreign Application Priority Data

Jul. 24, 2008 (JP) ................................. 2008-190563
Jul. 24, 2008 (JP) ................................. 2008-190564

(51) Int. Cl.
*H04M 1/22* (2006.01)
(52) U.S. Cl. ................................. 362/24; 362/27; 362/88
(58) Field of Classification Search .................... 362/24, 362/26, 27, 85, 86, 88; 200/310, 313, 314
See application file for complete search history.

(56) References Cited

U.S. PATENT DOCUMENTS

| 7,959,342 | B2 * | 6/2011 | Lee et al. ........................ 200/314 |
| 7,994,445 | B2 * | 8/2011 | Aihara et al. ................... 200/310 |
| 2007/0039809 | A1 | 2/2007 | Aihara et al. |
| 2007/0127227 | A1 * | 6/2007 | Osawa ............................. 362/26 |
| 2008/0218991 | A1 * | 9/2008 | Liu ................................. 362/26 |
| 2009/0310355 | A1 * | 12/2009 | Chung et al. ................... 362/236 |

FOREIGN PATENT DOCUMENTS

JP       2007-087749 A     4/2007

* cited by examiner

*Primary Examiner* — Y My Quach Lee
(74) *Attorney, Agent, or Firm* — Pearne & Gordon LLP

(57) ABSTRACT

A light guide sheet includes a material sheet having a film shape, first and second illuminations portion provided on the material sheet for diffusing light. The material sheet has a slit having substantially a strip shape provided therein and provided around the first illumination portion. The slit has a first edge and a second edge opposite to the first edge. The first edge faces the first illumination portion. The material sheet includes a first bridge and a second bridge linking the first edge of the first slit to the second edge across the first slit. This light guide sheet provides a movable contact assembly which is easily fabricated and provides preferable illuminating.

17 Claims, 7 Drawing Sheets

LIGHT GUIDE SHEET AND MOVABLE CONTACT ASSEMBLY INCLUDING THE SAME

FIELD OF THE INVENTION

The present invention relates to a light guide sheet and a movable contact assembly including the light guide sheet, used for operation panels of various electronic apparatuses.

BACKGROUND OF THE INVENTION

Various electronic apparatuses, particularly mobile terminals, such as a mobile phones, have recently includes operation panels illuminated by light emitting diodes or EL elements to facilitate identifying and activating push buttons and display sheets even in dark environment. Movable contact assemblies and switches used for these apparatuses are demanded to use easily and to be illuminated in various manners.

FIGS. 11 and 12 are a sectional view and a plan view of conventional switch 601, respectively. Light guide sheet 104 includes material sheet 101 made of light-transmissible film. Illumination portions 102A, 102B, and 102C each including plural projections are provided on an upper surface of material sheet 101.

Slit 103A having a strip shape and a squared U-shape is provided in material sheet 101 around illumination portion 102A. Slits 103B having a strip shape and an L-shape is provided in material sheet 101 around illumination portion 102C. Slits 103A and 103B passes between the upper surface and a lower surface of material sheet 101.

Base sheet 105 has a film shape. Plural movable contacts 106 have substantially a dome shape and are made of thin metal plates. An outer periphery of base sheet 105 is stuck onto the lower surface of light guide sheet 104 with an adhesive. Upper surfaces of plural movable contacts 106 are stuck onto a lower surface of base sheet 105 directly beneath illumination portions 102A, 102B, and 102C, thus providing movable contact assembly 107.

Plural circuit patterns are provided on upper and lower surfaces of circuit board 108. Plural fixed contacts 109 each including center fixed contact 109A and outer fixed contact 109B are provided the upper surface of circuit board 108. Center fixed contact 109A has substantially a circular shape. Outer fixed contact 109B has substantially a horseshoe shape or a ring-shape surrounding center fixed contact 109A.

Movable contact assembly 107 is stuck onto the upper surface of circuit board 108. An outer periphery of movable contact 106 is mounted onto outer fixed contact 109B. The center of the lower surface of movable contact 106 faces center fixed contact 109A with a predetermined interval between them.

Plural light emitters 110A and 110B implemented by a light-emitting device, such as a light emitting diode, are mounted on the upper surface of circuit board 108 at a side of light guide sheet 104. Light emitters 110A and 110B have light-emitting surface facing end surfaces 101C and 101D of material sheet 101, respectively.

Display sheet 111 is light-transmissible and has a film shape. Light blocking portion 111A is formed on a lower surface of display sheet 111 by, e.g. printing. Predetermined positions of light blocking portion 111A are hollowed in shapes, such as characters or symbols, to form plural display portions 111B. Display portions 111B are located directly above illumination portions 102A, 102B, and 102C of light guide sheet 104.

Switch 601 is installed to an operation panel of an electronic apparatus. Center fixed contact 109A, outer fixed contact 109B, and light emitters 110A and 110B are connected with an electronic circuit of the apparatus via the circuit patterns.

In FIG. 11, center fixed contact 109A is electrically disconnected from outer fixed contact 109B. When an operator presses down display portion 111B of display sheet 111, light guide sheet 104 and base sheet 105 sag to apply a pressing force onto the center part of movable contact 106. When the pressing force exceeds a predetermined level, movable contact 106 has its shape elastically reversed downward being accompanied with a click feel, and the center of the lower surface of movable contact 106 contacts center fixed contact 109A. This contact connects center fixed contact 109A electrically with outer fixed contact 109B via movable contact 106.

When the pressing force applied to display sheet 111 is released, movable contact 106 has its shape elastically reverse upward by an elastic self-restoring force, thus removing the center of the lower surface of movable contact 106 from center fixed contact 109A. This operation disconnects center fixed contact 109A electrically from outer fixed contact 109B.

The electronic circuit of the apparatus switches functions of the apparatus and supplies power to light emitters 110A and 110B according to electrical connection and disconnection between fixed contacts 109A and 109B. Upon the power being supplied, light emitters 110A and 110B emit light. In the case that light emitter 110A emits orange light, and that light emitter 110B emits green light, the orange light enters in light guide sheet 104 from end surface 101C of light guide sheet 104, and the green light enters in material sheet 121 of light guide sheet 125 from end surface 101D which is different from end surface 101C of light guide sheet 104. These lights transmit in material sheet 101 while reflecting.

The lights entering in material sheet 101 are diffused and reflected at plural illumination portions 102A, 102B, and 102C on the upper surface of material sheet 101 to illuminate display portion 111B of display sheet 111 from beneath. If the lights emitted by light emitters 110A and 110B have the above-described colors, a part of display portion 111B directly above illumination portion 102A is illuminated in orange color, and parts of display portion 111B directly above illumination portions 102B and 102C are illuminated in green color. This operation allows the operator to identify a displayed item, such as characters and symbols, even in dark environment and to operate the apparatus easily.

Slits 103A and 103B provided around illumination portions 102A and 102C block the light transmitting in material sheet 101. That is, the orange light from light emitter 110A reaches illumination portion 102A. A part of the reaching light is diffused and reflected to illuminate upward, and the other part of the light transmits from illumination portion 102A further along material sheet 101. The part of the light transmitting via illumination portion 102A is blocked by slit 103A having substantially the squared U-shape, thereby being prevented from reaching other illumination portions, such as illumination portion 102B or 102C. The green light emitted from light emitter 110B reaches illumination portion 102B. A part of the reaching light is diffused and reflected to illuminate upward, and the other part of the light transmits from illumination portion 102B further along material sheet 101. The part of the light transmitting via illumination portion 102B is blocked by slit 103B having substantially the L-shape. This prevents the lights having these colors from being mixed, and prevents portion which is not to be illuminated from being illuminated.

FIG. 13 is a plan view of light guide sheet 104. In processes of producing movable contact assembly 107 and switch 601, as shown in FIG. 13, illumination portions 102A and 102C on material sheet 101 may curl up and down, hence being prevented from sticking onto the upper surface of material sheet 105 and thus reducing workability. If material sheet 101 is strongly bent at this moment, the bent portion thereof can cause unevenness of illumination upon being illuminated.

SUMMARY OF THE INVENTION

A light guide sheet includes a material sheet having a film shape, first and second illuminations portion provided on the material sheet for diffusing light. The material sheet has a slit having substantially a strip shape provided therein and provided around the first illumination portion. The slit has a first edge and a second edge opposite to the first edge. The first edge faces the first illumination portion. The material sheet includes a first bridge and a second bridge linking the first edge of the first slit to the second edge across the first slit.

This light guide sheet provides a movable contact assembly which is easily fabricated and provides preferable illuminating.

DETAILED DESCRIPTION OF PREFERRED EMBODIMENTS

Exemplary Embodiment 1

Figure 1:
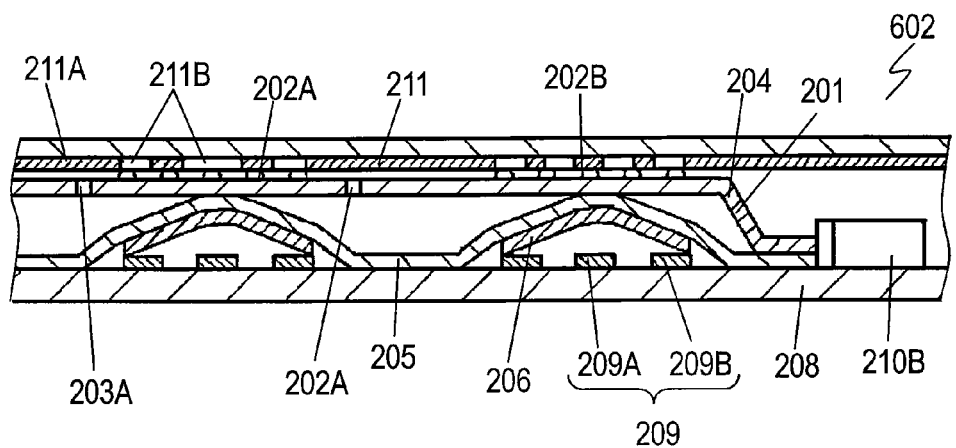
FIG. 1 is a sectional view of a switch according to Exemplary Embodiment 1 of the present application.
Figure 2:
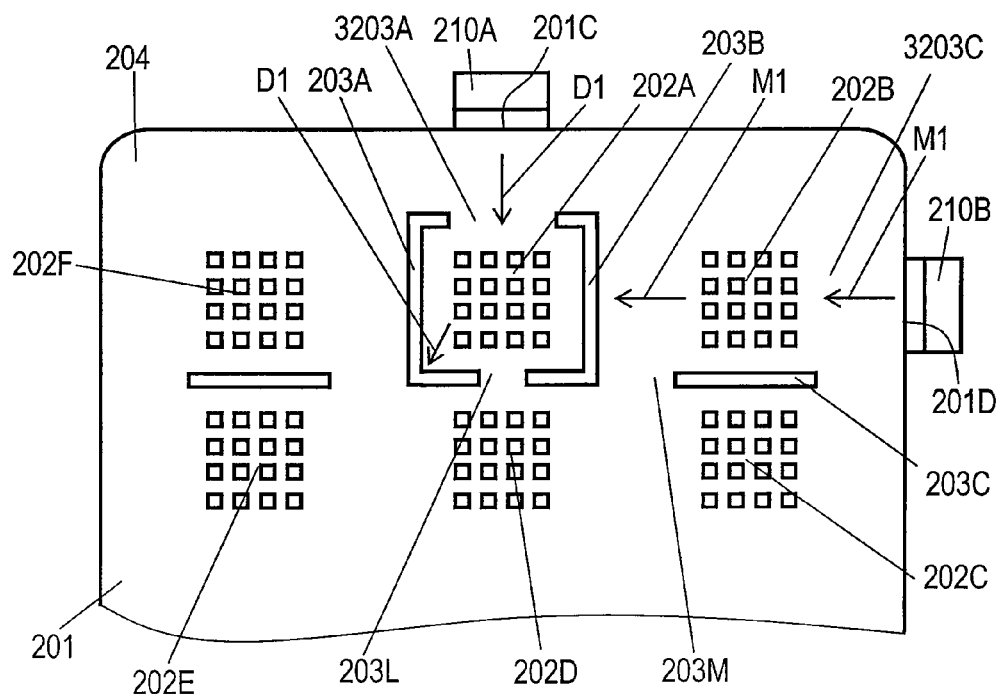
FIG. 2 is a plan view of the switch according to Embodiment 1.

FIGS. 1 and 2 are a sectional view and a plan view of switch 602 according to Exemplary Embodiment 1 of the invention, respectively. Light guide sheet 204 includes material sheet 201 made of light-transmissible film. Illumination portions 202A, 202B, 202C, 202D, 202E, and 202F, each including plural projections are provided on an upper surface of material sheet 201.

Slits 203A and 203B having a substantially strip shape and squared U-shaped are provided in material sheet 201 at an outer periphery of illumination portion 202A. Slits 203A and 203B face each other across illumination portion 202A. Slit 203C having substantially a strip shape and a linear shape is provided in material sheet 201 between illumination portions 202B and 202C. Slits 203A to 203C pass between the upper surface and a lower surface of material sheet 201. No slit is provided in a portion material sheet 201 between light emitter 210A and illumination portion 202A to provide connection portion 3203A which has no slit therein and which connects between end surface 101C and illumination portion 202A. No slit is provided in a portion material sheet 201 between light emitter 210B and illumination portion 202B to provide connection portion 3203C which has no slit therein and which connects between end surface 101D and illumination portion 202B.

Base sheet 205 has a film shape. Plural movable contacts 206 have substantially dome shapes had are made of thin metal plates. An outer periphery of base sheet 205 is stuck onto the lower surface of light guide sheet 204 with an adhesive. Upper surfaces of movable contacts 206 are stuck onto the lower surface of base sheet 205 directly beneath illumination portions 202A, 202B, and 202C, providing movable contact assembly 207.

Circuit patterns are provided on upper and lower surfaces of circuit board 208. Plural fixed contacts 209 each including center fixed contact 209A and outer fixed contact 209B are provided on the upper surface of circuit board 208. Center fixed contact 209A has substantially a circular shape. Outer fixed contact 109B has substantially a horseshoe shape or ring shape surrounding center fixed contact 209A.

Movable contact assembly 207 is stuck onto the upper surface of circuit board 208. An outer periphery of movable contact 206 is mounted on outer fixed contact 209B. The center of a lower surface of movable contact 206 faces center fixed contact 209A with a predetermined interval between them.

Light emitters 210A and 210B each implemented by a light-emitting device, such as a light emitting diode, are provided on the upper surface of circuit board 208 at a side of light guide sheet 204. Light emitters 210A and 210B have light-emitting surface facing end surfaces 201C and 201D of material sheet 201.

Display sheet 211 is light-transmissible and has a film shape. Light blocking portion 211A is formed on a lower surface of display sheet 211 by, e.g. printing. Predetermined positions of light blocking portion 211A are hollowed in shapes, such as characters or symbols, to form plural display portions 211B. Display portions 211B are located directly above illumination portions 202A, 202B, and 202C of light guide sheet 204.

Switch 602 is installed to an operation panel of an electronic apparatus. Center fixed contact 209A, outer fixed contact 209B, and light emitters 210A and 110B are connected with an electronic circuit of the apparatus via the circuit patterns.

Figure 12:
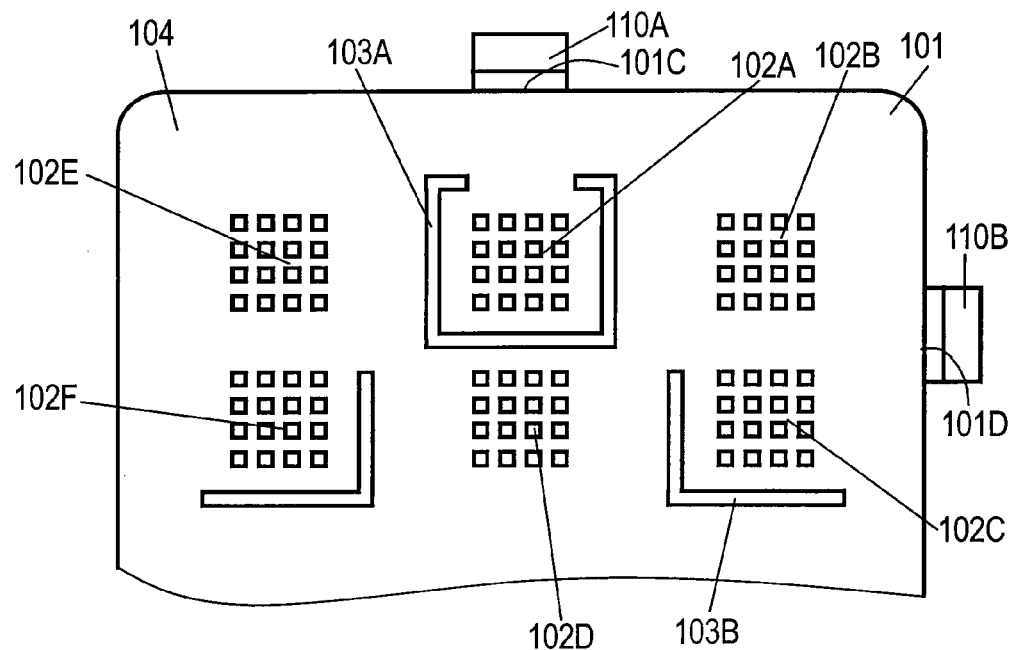
FIG. 12 is a plan view of the conventional switch.
Figure 13:
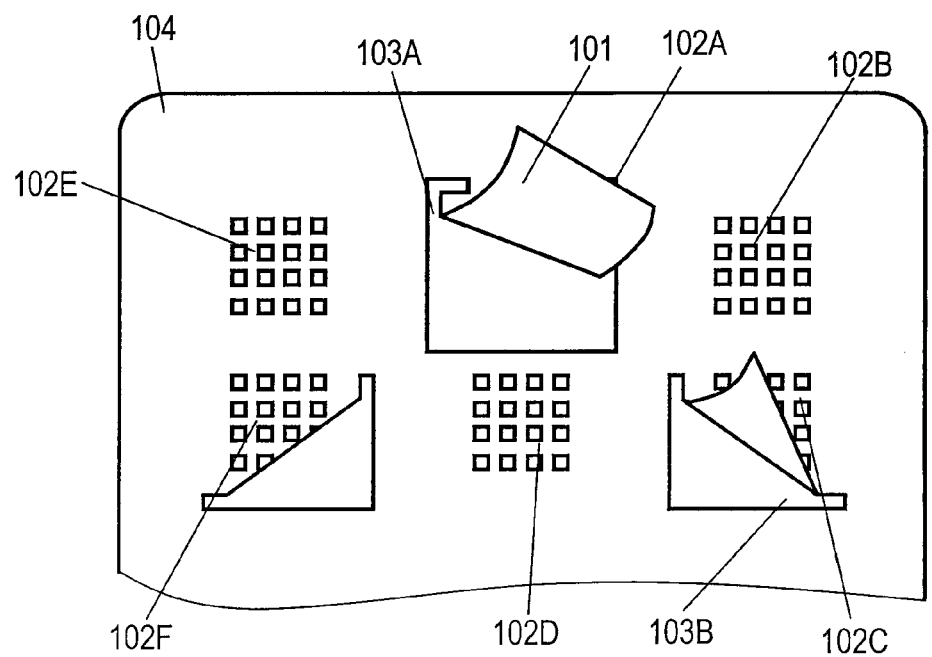
FIG. 13 is a plan view of the conventional switch.

In FIG. 12, center fixed contact 209A is electrically disconnected from outer fixed contact 209B. When an operator presses down display portion 211B of display sheet 211, light guide sheet 204 and base sheet 205 sag to apply a pressing force onto the center part of movable contact 206. When the pressing force exceeds a predetermined level, movable contact 206 has its shape elastically reversed downward being accompanied with a click feel, and the center of the lower surface of movable contact 206 contacts center fixed contact 209A. This contact connects center fixed contact 209A electrically with outer fixed contact 209B via movable contact 206.

When the pressing force applied to display sheet 211 is released, movable contact 206 has its shape elastically reverse upward by an elastic self-restoring force, thus removing the center of the lower surface of movable contact 206 from center fixed contact 209A. This operation disconnects center fixed contact 209A electrically from outer fixed contact 209B.

The electronic circuit of the apparatus switches functions of the apparatus and supplies power to light emitters 210A and 210B according to electrical connection and disconnection between fixed contacts 209A and 209B. Upon the power being supplied, light emitters 210A and 210B emit light. In the case that light emitter 210A emits orange light, and that light emitter 210B emits green light, the orange light enters in light guide sheet 204 from end surface 201C of light guide sheet 204, and the green light enters in material sheet 221 of light guide sheet 225 from end surface 201D which is different from end surface 201C of light guide sheet 204. These lights transmit in material sheet 201 while reflecting.

The lights entering in material sheet 201 are diffused and reflected at plural illumination portions 202A and 202B on the upper surface of material sheet 201 to illuminate display portion 211B of display sheet 211 from beneath. If the lights emitted by light emitters 210A and 210B have the above-described colors, a part of display portion 211B directly above illumination portion 202A is illuminated in orange color, and parts of display portion 211B directly above illumination portion 202B are illuminated in green color. This operation allows the operator to identify a displayed item, such as characters and symbols, even in dark environment and to operate the apparatus easily.

Slits 203A, 203B, and 203C provided around illumination portions 202A, 202B, and 202C block light transmitting in material sheet 201. That is, orange light D1 is blocked by slits 203A and 203B having the substantially squared U-shape, and green light M1 is blocked by slit 230C having a linear shape. This prevents the lights having these colors from being mixed, and prevents portion which is not to be illuminated from being illuminated.

In light guide sheet 204, bridge 203L is provided between respective ends of slits 203A and 203B. Bridge 203M is provided between respective ends of slits 203B and 203C. Bridges 203L and 203M prevent illumination portions 202A from curling up, hence allowing movable contact assembly 207 to be manufactured easily and to illuminate preferably.

Exemplary Embodiment 2

Figure 3:
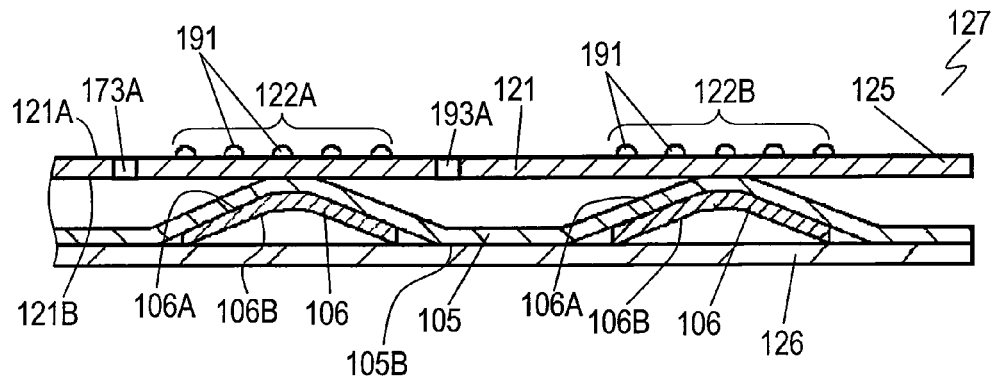
FIG. 3 is a sectional view of a movable contact assembly according to Exemplary Embodiment 2 of the present invention.
Figure 4:
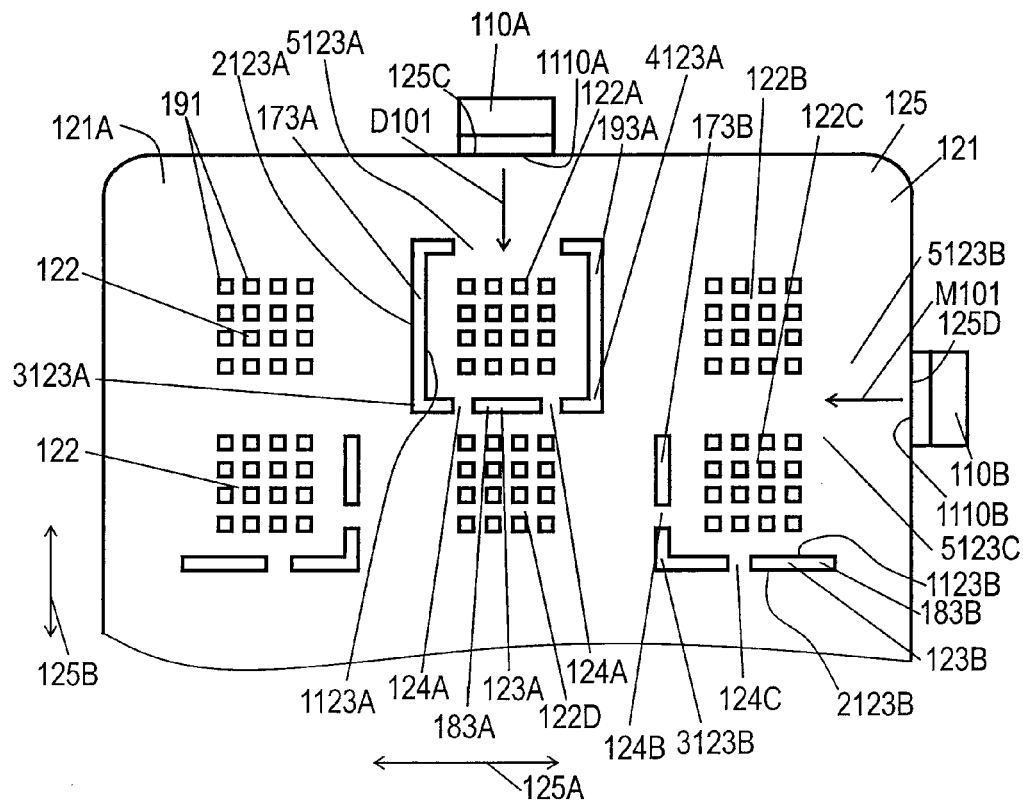
FIG. 4 is a plan view of a switch including the movable contact assembly according to Embodiment 2.

FIG. 3 is a sectional view of movable contact assembly 127 according to Exemplary Embodiment 2 of the present invention. FIG. 4 is a plan view of switch 1001 including movable contact assembly 127. Light-transmissible material sheet 121 is made of flexible film made of light-transmissible material, such as polyethylene terephthalate, polycarbonate, poly urethane, or silicone. Material sheet 121 has upper surface 121A and lower surface 121B opposite to upper surface 121A. Upper surface 121A and lower surface 121B of material sheet 121 are the upper and lower surfaces of light guide sheet 125, respectively. Plural illumination portions 122, 122A, 122B, 122C, and 122D are provided on upper surface 121A of material sheet 121 at predetermined positions. Each of illumination portions 122, 122A, 122B, 122C, and 122D includes plural projections 191 made of translucent material, such as polyester or epoxy, and formed on upper surface 121A of material sheet 121 by, e.g. printing.

Illumination portions 122, 122A, and 122B are arranged in direction 125A. Illumination portions 122, 122D, and 122C are arranged in direction 125A. Illumination portions 122A and 122D are arranged in direction 125B perpendicular to direction 125A. Illumination portions 122B and 122C are arranged in direction 125B.

Slit 123A having a substantially strip shape in a substantially squared U-shape are provided in material sheet 12a around illumination portion 122A. Slit 123B having a substantially strip shape in a substantially L-shape is provided in material sheet 121 around illumination portion 122C. Slits 123A and 123B pass between upper surface 121A and lower surface 121B of material sheet 121. Slit 123A has edges 1123A and 2123A opposite to each other extending in the direction in which slit 123A extends. Edge 1123A of slit 123A faces illumination portion 122A. Slit 123B has edges 1123B and 2123B opposite to each other extending in the direction in which slit 123B extends. Edge 1123B of slit 123B faces illumination portion 122C. Light guide sheet 125 has plural bridges 124A linking edge 1123A to edge 2123A across slit 123A; and plural bridges 124B and 124C linking edge 1123B to edge 2123B across slit 123B.

The shapes of slits 123A and 123B will be described in detail below.

Slit 123A having a substantially squared U-shape includes slit 173A having a linear shape, slit 183A having a linear shape connected with slit 173A at corner 3123A, and slit 193A having a linear shape connected with slit 183A at corner 4123A. Slits 173A and 193A extend in direction 125B. Slit 183A extends in direction 125A. Slit 173A is positioned between illumination portions 122 and 122A. Slit 183A is positioned between illumination portions 122A and 122D. Slit 193A s positioned between illumination portions 122A and 122B. Plural bridges 124A are placed at slit 183A of slit 123A.

Slit 123B having substantially an L-shape includes slit 173B having substantially a linear shape and slit 183B having substantially a linear shape connected with 173B at corner 3123B. Slit 173B extends in direction 125B. Slit 183B extends in direction 125A. Slit 173B is positioned between illumination portions 122C and 122D. Slit 185B is positioned at a position opposite to illumination portions 122B with respect to illumination portion 122C. Bridge 124B is placed at slit 173B of slit 123B. Bridge 124C is placed at slit 183B of slit 123B.

Base sheet 105 has a film shape. Movable contact 106 has substantially a dome shape having upper surface 106A which is a convex surface and lower surface 106B which is a concave surface opposite to upper surface 106A. Movable contact 106 is made of a conductive thin metal plate, such as a copper alloy plate or a steel plate. Upper surface 106A of movable is stuck onto lower surface 105B of base sheet 105 to hold movable contact 106. A predetermined position of an outer periphery of base sheet 105 is stuck onto lower surface 121B of light guide sheet 125 with an adhesive. Upper surfaces 106A of plural movable contacts 106 are stuck to positions on lower surface 105B of base sheet 105 directly beneath illumination portions 122, 122A, 122B, 122C, and 122D.

Separator 126 having a film shape and made of resin film, such as polyethylene terephthalate film, is stuck onto lower surface 105B of base sheet 105 so as to entirely cover lower surface 105B to prevent dust and soil from adhering to lower surface 106B of movable contact 106 while being stored and carried.

Figure 5:
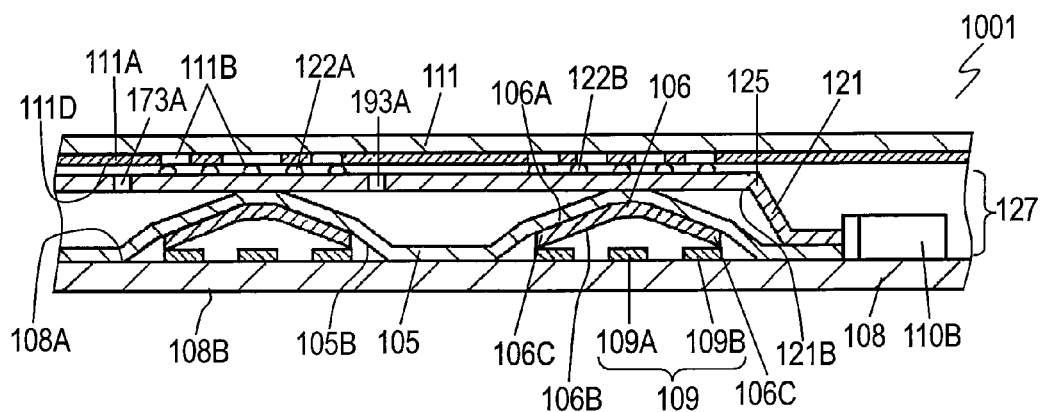
FIG. 5 is a sectional view of the switch according to Embodiment 2.

Edges 1123A and 2123A of slit 123A having substantially the squared U-shape are linked to each other via plural bridges 124A. Edges 1123B and 2123B of slit 123B having substantially the L-shape are linked to each other via plural bridges 124B and 124C. Hence, when light guide sheet 125 is stuck to base sheet 105, portions of material sheet 121 around illumination portions 122A and 122C do not curl upward or downward. As a result, the portions of material sheet 121 around illumination portions 122A and 122C of light guide sheet 125 do not bend, hence allowing movable contact assembly 127 to be produced easily, and not providing illumination portions 122A and 122C with creases, FIG. 5 is a sectional view of switch 1001 including movable contact assembly 127. Circuit board 108 is made of resin, such as polyethylene terephthalate, polyimide, or polycarbonate, having a film shaped, or is made of insulating material, such as paper phenol or glass epoxy, having a plate shape. Plural circuit patterns made of conductive material, such as copper, are provided on upper surface 108A and lower surface 108B of circuit board 108. Plural fixed contacts 109 each including center fixed contact 109A and outer fixed contact 109B are provided on upper surface 108A. Center fixed contact 109A is made of conductive material, such as copper or carbon, and has a circular shape. Outer fixed contact 109B is made of conductive material, such as copper or carbon, and has substantially a horseshoe shape or a ring shape surrounding center fixed contact 109A.

Separator 126 is peeled off from movable contact assembly 127. Then, lower surface 105B of base sheet 105 of movable contact assembly 127 is stuck onto upper surface 108A of circuit board 108. Outer periphery 106C of movable contact 106 is mounted on outer fixed contact 109B. The center of lower surface 106B of movable contact 106 faces center fixed contact 109A with a predetermined interval between contacts 106 and 109A.

Plural light emitters 110A and 110B implemented by light-emitting devices, such as light emitting diodes, are provided on upper surface 108A of circuit board 108. As shown in FIG. 4, light emitter 110A has light-emitting surface 1110A placed on end surface 121C of material sheet 121 approximating illumination portion 122A to emit light to end surface 121C. Light emitter 110B has light-emitting surface 1110B placed on end surface 121D of material sheet 121 approximating illumination portions 122B and 122C to emit light to end surface 121D. No slit is provided in a portion of material sheet 121 between light emitter 110A and illumination portion 122A to providing connection portion 5123A which has no slit therein and connects between end surface 121C and illumination portion 122A. No slit is provided in portions of material sheet 121 between light emitter 110B and illumination portion 122B and between light emitter 110B and illumination portion 122C to provide connection portions 5123B and 5123C which have no slit therein and which connect between end surface 121D and illumination portion 122B and between end surface 121D and illumination portion 122C.

Display sheet 111 is light-transmissible and has a film shape. Light blocking portion 111A is formed on a lower surface of display sheet 111 by, e.g. printing. Display portions 111B are provided on lower surface 111B of display sheet 111. Predetermined positions of light blocking portion 111A are hollowed in shapes, such as characters or symbols, to form display portions 111B. Display portions 111B are located directly above illumination portions 122, 122A, 122B, 122C, and 122D of light guide sheet 125.

Switch 1001 is installed to an operation panel of an electronic apparatus. Center fixed contact 109A, outer fixed contact 109B, and light emitters 110A and 110B are connected with an electronic circuit of the apparatus via the circuit patterns. In the status shown in FIG. 5, fixed contacts 109A and 109B are electrically disconnected from each other.

When an operator presses certain display portion 111B on display sheet 111 downward, light guide sheet 125 and base sheet 105 sags to apply a pressing force onto upper surface 106A which is the convex surface of movable contact 106. When the pressing force exceeds a predetermined level, the dome shape of movable contact 106 elastically reverses accompanied with a click feel, that is, upper surface 106A changes from convex to concave, and lower surface 106B changes from concave to convex. This change causes the center of lower surface 106B of movable contact 106 to contact center fixed contact 109A, thereby connecting center fixed contact 109A electrically with outer fixed contact 109B via movable contact 106.

When the pressing force applied onto display sheet 111 is released, the dome shape of movable contact 106 elastically reverses by an elastic self-restoring force, and removes the center of lower surface 106B of movable contact 106 from center fixed contact 109A, thereby electrically disconnecting center fixed contact 109A from outer fixed contact 109B.

The electronic circuit switches functions of the apparatus and supplies power to light emitters 110A and 110B according to electrical connection and disconnection of fixed contact 109 (109A, 109B). Upon the power being supplied, light emitters 110A and 110B emit lights D101 and M101, respectively. In the cases that light emitter 110A emits orange light and that light emitter 110B emits green light, orange light D101 enters in light guide sheet 125 from end surface 121C, and green light M101 enters in light guide sheet 125 from end surface 121D. Lights D101 and M101 which enter transmit in material sheet 121 while reflecting in material sheet 121.

Light D101 is diffused and reflected at illumination portion 122A on upper surface 121A of material sheet 121 to illuminate display portion 111B on display sheet 111 from beneath. Light M101 is diffused and reflected at illumination portions 122B and 122C on upper surface 121A of material sheet 121 to illuminate display portion 111B on display sheet 111 from beneath. Thus, a portion of display portion 111B directly above illumination portion 122A illuminates in orange color, and portions of display portion 111B directly above illumination portions 122B and 122C illuminate in green color. This allows the operator to identify a displayed item, such as a character and symbol, on display portion 111B even in dark environment to easily operate the apparatus.

Slits 123A and 123B block lights D101 and M101 emitted from light emitters 110A and 110B, respectively. If light D101 is different from M101 in color, or if one of light emitters 110A and 110B is lit on and the other is lit off, the slits prevent lights D101 and M101 from being mixed in light guide sheet 125 and from illuminating illumination portions 122A, 122B, and in the mixed colors, and prevents an illumination portion which is not to be illuminated from being illuminated even slightly.

Bridges 124A, 124B, and 124C prevent material sheet 121 from curling and bending, and prevent illumination portions 122A, 122C from having creases, thereby allowing illumination portions 122A, 122B, and 122C to be illuminated preferably without unevenness of brightness.

Instead of two bridges 124A placed at slit 123A and two bridges 124B and 124C placed at slit 123B, single bridge 124A placed at slit 123A and single bridge 124B placed at slit 123B can prevent portions of material sheet 121 around illumination portions 122A and 122C from largely curling. However, plural bridges 124A placed at slit 123A at a predetermined interval can be placed closer to corners 3123A and 4123A, and plural bridges 124B, 124C placed at slit 123B at a predetermined interval allow corner 3123B to be placed between bridges 124B and 124C. This structure allows bridges 124A and bridges 124B, 124C to reliably prevent the portions of material sheet 121 around illumination portions 122A and 122C from curling and bending, thereby providing preferable illuminating without unevenness of illumination.

Figure 6:
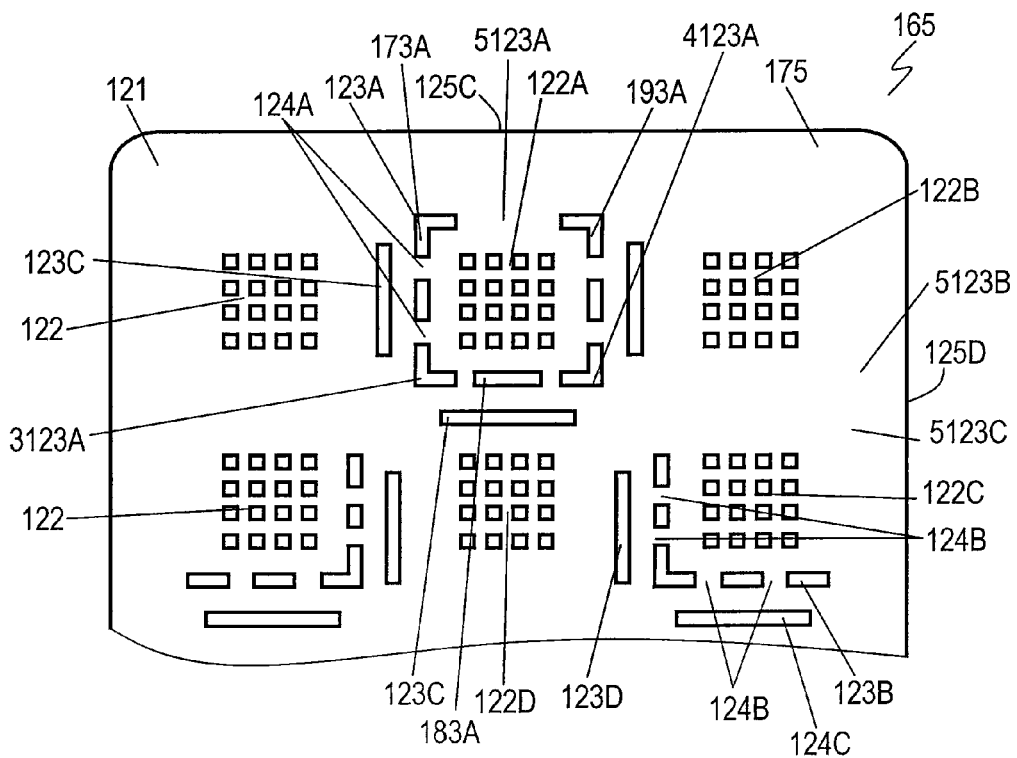
FIG. 6 is a plan view of another movable contact assembly according to Embodiment 2.

FIG. 6 is a plan view of another movable contact assembly 165 according to Embodiment 2. In FIG. 6, components identical to those of movable contact assembly shown in FIGS. 3 and 4 are denoted by the same reference numerals, and their description will be omitted. In movable contact assembly 165, more bridges, e.g. six bridges 124A and four bridges 124B and 124C, are provided at slits 123A and 123B. These bridges allows light guide sheet 175 to be stuck onto base sheet 105 while preventing portions of light guide sheet 175 around illumination portions 122A and 122C from curling or bending.

According to Embodiment 2, the width between edges 1123A and 2123A of slit 123A and between edges 1123B and 2123B of slit 123B ranges approximately form 0.1 mm to 1 mm. The width of bridges 124A, 124B, and 124C in the direction in which edges 1123A, 1123B, 2123A, and 2123B extend ranges approximately from 1 mm to 5 mm. This width of the bridges prevents lights D101 and M101 from leaking through bridges 124A, 124B, and 124C. However, in the case that the number of light emitters 110A and 110B is increased to illuminate more brightly, slits 123D facing bridges 124A, 124B, and 124C may be provided in material sheet 121, as shown in FIG. 6. Slits 123D block light that leaks from bridges 124A, 124B, and 124D, thus almost completely preventing the light from leaking.

According to Embodiment 2, illumination portions 122, 122A, 122B, 122C, and 122D are formed on the portions of upper surface 121A of material sheet 121 directly above movable contacts 106 by printing. According to Embodiment 2, illumination portions 122, 122A, 122B, 122C, and 122D may be formed on lower surface 121B, not on upper surface 121A of material sheet 121. Illumination portions 122, 122A, 122B, 122C, and 122D each including plural projections can be formed by various methods, such as sticking, press work, or molding, besides printing. The illumination portions can be implemented not by the projection, but by dimples.

In FIG. 5, base sheet 105 with plural movable contacts 106 stuck onto lower surface 105B is stuck onto lower surface 121B of light guide sheet 125. A movable contact assembly according to Embodiment 2 does not necessarily include base sheet 105. In this case, upper surfaces 106A of plural movable contacts 106 are stuck directly onto lower surface 121B of light guide sheet 125, which reduces the number of components as a whole, thereby providing movable contact assemblies 127 and 165 with a simple structure and small cost.

Figure 7A:
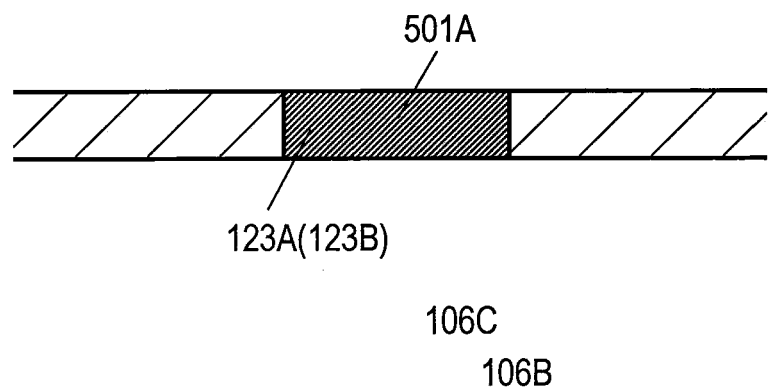
FIG. 7A is a sectional view of a slit of the movable contact assembly according to Embodiment 2.

FIG. 7A is a sectional view of slit 123A (123B). Material 501A absorbing light can fill slit 123A (123B). Material 501A can be ink with dark color, such as black color. Slit 123A (123B) and material 501A block light more securely.

Figure 7B:
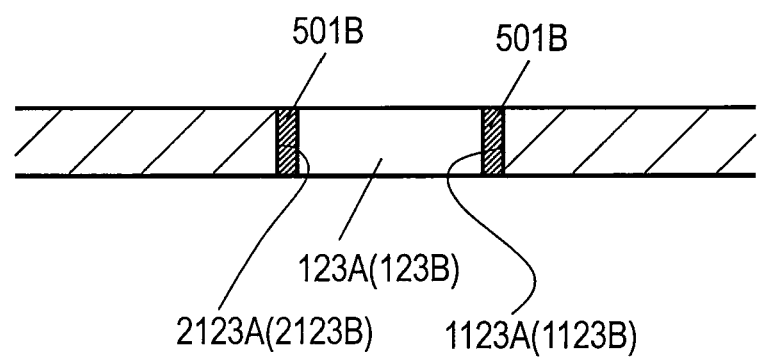
FIG. 7B is a sectional view of a slit of the movable contact assembly according to Embodiment 2.

FIG. 7B is a sectional view of another slit 123A (123B). Material 501B absorbing light can be provided on edges 1123A and 2123A (1123B and 2123B) of slit 123A (123B). Material 501B can be ink with dark color, such as black color. Slit 123A (123B) and material 501B block light more securely.

Exemplary Embodiment 3

Figure 8:
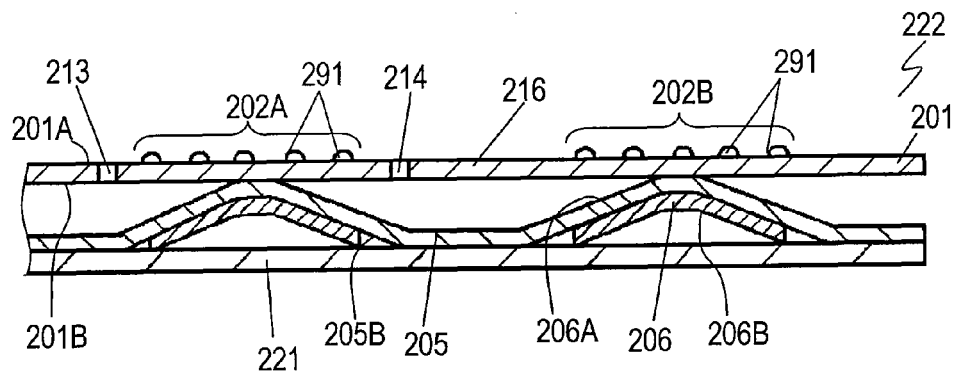
FIG. 8 is a sectional view of a movable contact assembly according to Exemplary Embodiment 3 of the invention.
Figure 9:
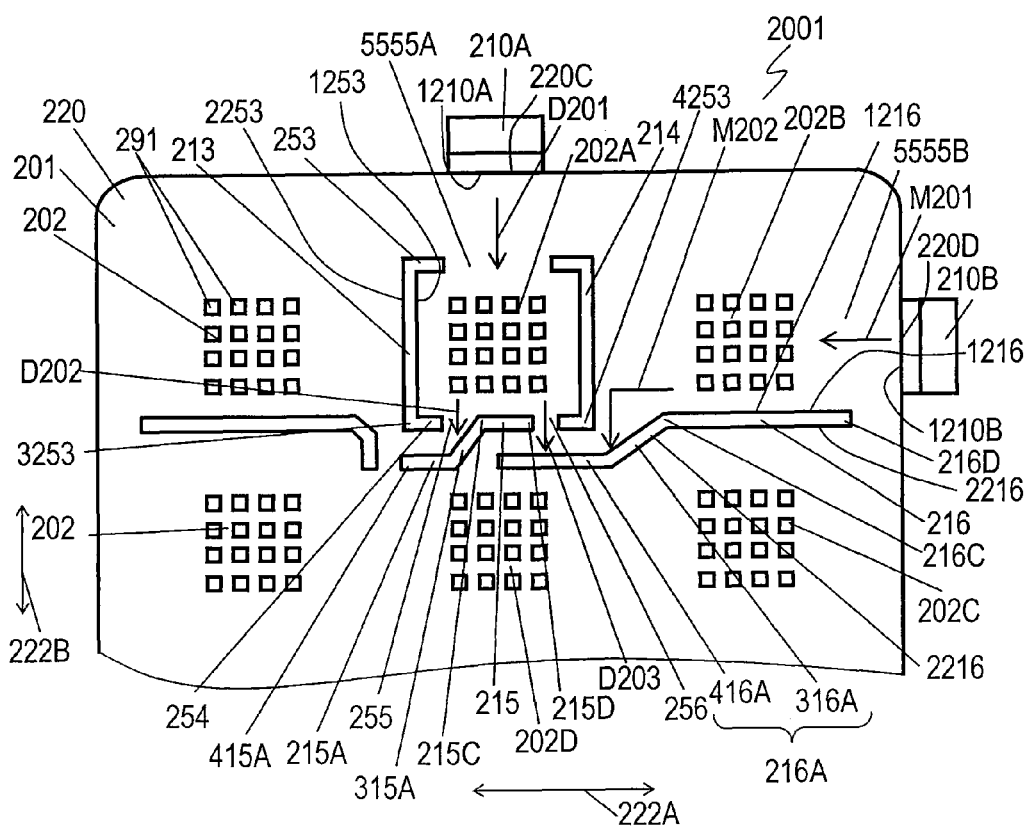
FIG. 9 is a plan view of a switch including the movable contact assembly according to Embodiment 3.

FIG. 8 is a sectional view of movable contact assembly 222 according to Exemplary Embodiment 3 of the present invention. FIG. 9 is a plan view of switch 2001 including movable contact assembly 222. Light-transmissible material sheet 201 is made of flexible film made from light-transmissible material, such as polyethylene terephthalate, polycarbonate, poly urethane, or silicone. Material sheet 201 has upper surface 201A and lower surface 201B opposite to upper surface 201A. Upper surface 201A and lower surface 201B of material sheet 201 are upper and lower surfaces of light guide sheet 220 shown in FIG. 10, respectively. Illumination portions 202, 202A, 202B, 202C, and 202D are provided on upper surface 201A of material sheet 201 at predetermined positions. Each of illumination portions 202, 202A, 202B, 202C, and 202D includes plural projections 291 made of translucent material, such as polyester or epoxy, formed on upper surface 201A of material sheet 201 by, e.g. printing.

Illumination portions 202, 202A, and 202B are arranged in direction 225A. Illumination portions 202, 202D, and 202C are arranged in direction 222A. Illumination portions 202A and 202D are arranged in direction 225B perpendicular to direction 222A. Illumination portions 202B and 202C are arranged in direction 222B.

Slit 253 having substantially a strip shape and a squared U-shape is provided in material sheet 201 around illumination portion 202A. Slit 216 having substantially a linear strip shape is provided in material sheet 201 between illumination portions 202B and 202C. Slits 253 and 216 pass between upper surface 201A and lower surface 201B of material sheet 201. Slit 253 has edges 1253 and 2253 opposite to each other extending in the direction in which slit 253 extends. Edge 1253 of slit 253 faces illumination portion 202A. Slit 216 has edges 1216 and 2216 opposite to each other extending in the direction in which slit 216 extends. Edge 1216 of slit 216 faces illumination portion 202B. Light guide sheet 220 has bridges 255 and 256 linking edge 1253 to edge 2253 across slit 253.

The shapes of slits 216 and 253 will be described in detail below.

Slit 253 having substantially the squared U-shape includes slit 213 having a linear shape, slit 254 having a linear shape connected with slit 213 at corner 3253, and slit 214 having a linear shape connected with slit 254 at corner 4253. Slits 213 and 214 extend in direction 222B. Slit 254 extends in direction 222A. Slit 213 is positioned between illumination portions 202 and 202A. Slit 254 is positioned between illumination portions 202A and 202D. Slit 214 is positioned between illumination portions 202A and 202B. Plural bridges 255 and 256 are provided at slit 254 of slit 253. Bridge 255 is positioned close to corner 3253. Bridge 256 is positioned closer to corner 4253 than bridge 255 is.

Slit 254 includes slit 215 having ends 215C and 215D reaching bridges 255 and 256, respectively. Light blocker 215A having substantially a strip shape and blocking light is provided in material sheet 201. Light blocker 215A has portion 315A extending from end 215C of slit 215 in a direction away from illumination portion 202A, and portion 415A extending from portion 315A in direction 222A. Light blocker 215A extends beyond bridge 255 to reach corner 3253 in direction 222A. Light blocker 215A is implemented by a slit provided in material sheet 201 spaced from slit 253 (254).

Slit 216 having substantially a linear shape extends in direction 222A, and is positioned between illumination portions 202B and 202C. Slit 216 has end 216C facing slit 253 and end 216D which is farther from slit 253 than end 216C is. Light blocker 216A having substantially a strip shape and blocking light is provided in material sheet 201. Light blocker 216A includes portion 316A extending from end 216C of slit 216 in a direction away from illumination portions 202A and 202B, and part 416A extending from part 316C in direction 222A. Light blocker 215A extends beyond bridge 256 to reach, in direction 222A, a position facing slit 215. Light blocker 216A is implemented by a slit provided in material sheet 201 spaced from slit 253 (254).

According to Embodiment 3, the width between edges 1253 and 2253 of slit 253 and the width between edges 1216 and 2216 of slit 216 range approximately from 0.1 mm to 1 mm. The width of bridges 225 and 256 in the direction in which edges 1253 and 2253 extend ranges approximately from 1 mm to 5 mm. The width of light blockers 215A and 216A is the same as that of slits 253 and 216.

Base sheet 205 has a film shape. Movable contact 206 has substantially a dome shape with upper surface 206A which is a convex surface and lower surface 206B which is a concave surface opposite to upper surface 206A. Movable contact 206 is made of a conductive thin metal plate, such as a copper alloy plate or a steel plate. A predetermined portion of an outer periphery of base sheet 205 is stuck onto lower surface 201B of light guide sheet 220 with an adhesive. Upper surfaces 206A of plural movable contacts 206 are stuck to positions on lower surface 205B of base sheet 205 directly beneath illumination portions 202, 202A, 202B, 202C, and 202D.

Separator 221 having a film shape and made of resin film, such as polyethylene terephthalate, is stuck onto lower surface 205B of base sheet 205 so as to entirely cover lower surface 205B to prevent dust and soil from adhering to lower surface 206B of movable contact 206 while being stored or carried.

Figure 10:
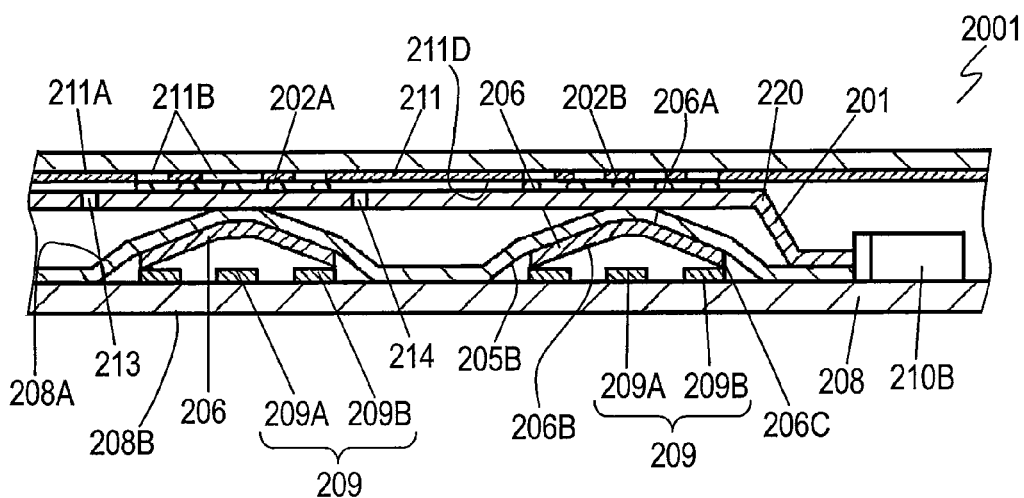
FIG. 10 is a sectional view of the switch according to Embodiment 3.
Figure 11:
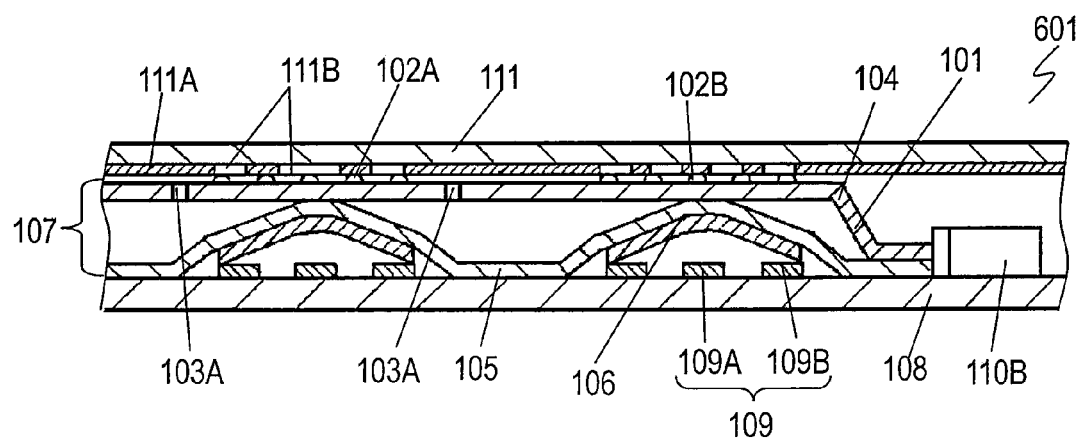
FIG. 11 is a sectional view of a conventional switch.

FIG. 10 is a sectional view of switch 2001 including movable contact assembly 227. Circuit board 208 is made of resin, such as polyethylene terephthalate, polyimide, or polycarbonate, having a film shaped, or is made of insulating material, such as paper phenol or glass epoxy, having a plate shape. Plural circuit patterns made of conductive material, such as copper, are provided on upper surface 208A and lower surface 208B of circuit board 208. Plural fixed contacts 209 each including center fixed contact 209A and outer fixed contact 209B are provided on upper surface 208A. Center fixed contact 209A is made of conductive material, such as copper or carbon, and has a circular shape. Outer fixed contact 209B is made of conductive material, such as copper or carbon, and has substantially a horseshoe shape or a ring shape surrounding center fixed contact 209A.

Separator 221 is removed from movable contact assembly 222. Then, lower surface 205B of base sheet 205 of movable contact assembly 222 is stuck onto upper surface 208A of circuit board 208. Outer periphery 206C of movable contact 206 is mounted on outer fixed contact 209B. The center of lower surface 206B of movable contact 206 faces center fixed contact 209A with a predetermined interval.

Plural light emitters 210A and 210B implemented by light-emitting device, such as light emitting diodes, are provided on upper surface 208A of circuit board 208. As shown in FIG. 9, light emitter 210A is placed on end surface 220C of material sheet 201 approximating illumination portion 202A, and has light-emitting surface 1210A emitting light to end surface 220C. Light emitter 210B is placed on end surface 220D of material sheet 201 approximating illumination portion 202B, and has light-emitting surface 1210B emitting light to end surface 220D. No slit is provided in a portion of material sheet 201 between light emitter 210A and illumination portion 202A to providing connection portion 5555A which has no slit therein and connects between end surface 201C and illumination portion 202A. No slit is provided in a portion of material sheet 201 between light emitter 210B and illumination portion 202B to provide connection portion 5555B which has no slit therein and which connects between end surface 201D and illumination portion 202B.

Display sheet 211 is light-transmissible and has a film shape. Light blocking portion 211A is formed on a lower surface of display sheet 211 by, e.g. printing. Display portions 211B are provided on lower surface 211B of display sheet 211. Predetermined positions of light blocking portion 211A are hollowed in shapes, such as characters or symbols, to form display portions 211B. Display portions 211B are located directly above illumination portions 222, 222A, 222B, 222C, and 222D of light guide sheet 225.

Display sheet 211 is light-transmissible and has a film shape. Lower surface 211D of display sheet 211 is provided thereon with light blocker 211A formed such as by printing; and plural display portions 211B. Display portion 211B is formed by hollowing a given position of light blocker 211A in a shape such as a character and symbol. Display portion 211B is arranged on light guide sheet 220 directly over illumination portions 202, 202A, 202B, 202C, and 202D.

Switch 2001 is installed to an operation panel of an electronic apparatus. Center fixed contact 209A, outer fixed contact 209B, and light emitters 210A and 210B are connected with an electronic circuit of the apparatus via the circuit patterns. In the status shown in FIG. 10, fixed contacts 209A and 209B are electrically disconnected from each other.

When an operator presses certain display portion 211B on display sheet 211 downward, light guide sheet 225 and base sheet 205 sags to apply a pressing force onto upper surface 206A which is the convex surface of movable contact 206. When the pressing force exceeds a predetermined level, the dome shape of movable contact 206 elastically reverses accompanied with a click feel, that is, upper surface 206A changes from convex to concave, and lower surface 206B changes from concave to convex. This change causes the center of lower surface 206B of movable contact 206 to contact center fixed contact 209A, thereby connecting center fixed contact 209A electrically with outer fixed contact 209B via movable contact 206.

When the pressing force applied onto display sheet 211 is released, the dome shape of movable contact 206 elastically reverses by an elastic self-restoring force, and removes the center of lower surface 206B of movable contact 206 from center fixed contact 209A, thereby electrically disconnecting center fixed contact 209A from outer fixed contact 209B.

The electronic circuit switches functions of the apparatus and supplies power to light emitters 210A and 210B according to electrical connection and disconnection of fixed contact 209 (209A, 209B). Upon the power being supplied, light emitters 210A and 210B emit lights D201 and M201, respectively. In the cases that light emitter 210A emits orange light D201 and that light emitter 210B emits green light M201, orange light D201 enters in material sheet 201 of light guide sheet 220 from end surface 220C. Green light M201 enters in light guide sheet 220 from end surface 220D. Lights D201 and M201 which enter transmit in material sheet 201 while reflecting in material sheet 201.

Light D201 is diffused and reflected at illumination portion 202A on upper surface 201A of material sheet 201 to illuminate display portion 211B on display sheet 211 from beneath. Light M201 is diffused and reflected at illumination portion 202B on upper surface 201A of material sheet 201 to illuminate display portion 211B on display sheet 211 from beneath. This Thus, a portion of display portion 211B directly above illumination portion 202A is illuminated in orange, and a portion of display portion 211B directly above illumination portion 201B is illuminated in green. This operation allows an operator to identify a displayed item, such as a character and symbol, on display portion 211B even in dark environment to easily operate the apparatus.

Slits 253 and 216 block lights D201 and M201 emitted from light emitters 210A and 210B, respectively. Light D202 emitted from light emitter 210A and leaking through bridge 255 is blocked by light blocker 215A, thus being prevented from reaching illumination portions 202 and 202D. Light D203 emitted from light emitter 210A and leaking through bridge 256 is blocked by light blocker 216A, thus being prevented from reaching illumination portion 202D. Further, light M202 emitted from light emitter 210B and leaking through between end 216C of slit 216 and corner 4253 of slit 253 is blocked by light blocker 216A, thus being prevented from reaching illumination portions 202C and 202D. If light D201 is different from M201 in color, or if one of light emitters 210A and 210B is lit on and the other is lit off, the slits prevent lights D201 and M201 from being mixed in light guide sheet 225 and from illuminating illumination portions 202A, 202B, and in the mixed colors, and mostly prevents an illumination portion which is not to be illuminated from being illuminated even slightly.

Edges 1253 and 2253 of slit 253 having substantially the squared U-shape are linked to each other via plural bridges 255 and 256. When light guide sheet 220 is stuck onto base sheet 205, a portion of material sheet 201 around illumination portion 202A does not curl upward or downward. Bridges 255 and 256 prevent the portion of material sheet 201 of light guide sheet 220 around illumination portion 202A from bending, hence allowing movable contact assembly 222 to be produced easily. Bridges 255 and 256 prevents illumination portion 202A from have creases, thereby allowing illumination portion 202A to illuminate preferably without unevenness of brightness.

According to Embodiment 3, illumination portions 202, 202A, 202B, 202C, and 202D are formed on ion portions 202, 202A, 202B, 202C, 202D are formed on the portions of upper surface 201A of material sheet 201 directly above movable contacts 206 by printing. According to Embodiment 3, illumination portions 202, 202A, 202B, 202C, and 202D can be formed on lower surface 201B of material sheet 201. Illumination portions 202, 202A, 202B, 202C, and 202D each including plural projections can be formed by various methods, such as sticking, press work, or molding, besides printing. The illumination portion may be implemented not by the projections, but by dimples.

In FIG. 10, base sheet 105 with plural movable contacts 206 stuck to predetermined positions on lower surface 205B is stuck onto the predetermined portion of lower surface 201B of light guide sheet 220. A movable contact assembly according to Embodiment 3 do not necessarily include base sheet 205. In this case, upper surfaces 206A of plural movable contact 206 are stuck directly onto lower surface 201B of light guide sheet 220. This reduces the number of components as a whole, thereby providing movable contact assembly 222 with a simple structure and small cost.

According to the embodiments, terms, such as "upper surface", "lower surface", "directly above", and "directly beneath", indicating directions do not express absolute directions, such as a vertical direction, but do express a relative direction determined only by relative positions between components such as material sheets 121 and 201, base sheets 105 and 205, and movable contacts 106 and 206, of movable contact assemblies 127 and 222.

What is claimed is:

1. A light guide sheet comprising:
   a material sheet having a film shape, the material sheet being configured to introduce therein light from a first light emitter and light from a second light emitter;
   a first illumination portion provided on the material sheet, the first illumination portion diffusing the light from the first light emitter; and
   a second illumination portion provided on the material sheet, the second illumination portion diffusing the light from the second light emitter, wherein
   the material sheet has a first slit portion between the first illumination portion and the second illumination portion, the first slit portion including two or more first slits and a bridge, each of the first slits having substantially a strip shape provided therein, the first slit portion being provided around the first illumination portion, and
   one of the two or more first slits has a first end and a second end, said one of the two or more first slits bends at a bending point, said one of the two or more first slits having a first portion extending from the first end to the bending point and a second portion extending from the second end to the bending point,
   the bending point of said one of the two or more first slits is opposed to an end of another of the two or more first slits in a certain direction,
   said another of the two or more first slits has a portion extending from the end of said another of the two or more first slits in parallel to the second portion of said one of the two or more first slits, and
   the first portion of said one of the two or more first slits extends beyond the bridge and the end of said another of the two or more first slits.

2. The light guide sheet of claim 1, wherein
   the material sheet has a second slit portion including a second slit having substantially a strip shape provided therein, the second slit being provided around the second illumination portion, the second slit having a third edge and a fourth edge opposite to the third edge, the third edge facing the second illumination portion,
   the second slit has an end facing the first slit, and
   the material sheet includes a light blocker (216A) having a portion which extends from the end of the second slit and which extends beyond the bridge.

3. The light guide sheet of claim 1, wherein at least one of the first slits has an L-shape.

4. The light guide sheet of claim 1, further comprising materials (501A) filling the first slits, the materials absorbing light.

5. The light guide sheet of claim 1, further comprising materials (501B) applied on edges of the first slits, the materials absorbing light.

6. The light guide sheet of claim 1, wherein the portion of said another of the two or more first slits and the second portion of said one of the two or more first slits extend in the certain direction.

7. The light guide sheet of claim 1, wherein the first portion of said one of the two or more first slits and the portion of said another of the two or more first slits extending from the end of said another of the two or more first slits in parallel to the second portion of said one of the two or more first slits extends on a straight line.

8. The light guide sheet of claim 1, wherein said another of the two or more first slits has a substantially squared U-shape.

9. A movable contact assembly comprising:
a material sheet having a film shape, the material sheet being configured to introduce therein light from a first light emitter and light from a second light emitter;
a first illumination portion provided on the material sheet, the first illumination portion diffusing the light from the first light emitter;
a second illumination portion provided on the material sheet, the second illumination portion diffusing the light from the second light emitter; and
a movable contact attached on the material sheet directly beneath the first illumination portion, wherein
the material sheet has a first slit portion between the first illumination portion and the second illumination portion, the portion including two or more first slits and a bridge, each of the first slits having substantially a strip shape provided therein, the first slit being provided around the first illumination portion
one of the two or more first slits has a first end and a second end, said one of the two or more first slits bends at a bending point, said one of the two or more first slits having a first portion extending from the first end to the bending point and a second portion extending from the second end to the bending point,
the bending point of said one of the two or more first slits is opposed to an end of another of the two or more first slits in a certain direction,
said another of the two or more first slits has a portion extending from the end of said another of the two or more first slits in parallel to the second portion of said one of the two or more first slits, and
the first portion of said one of the two or more first slits extends beyond the bridge and the end of said another of the two or more first slits.

10. The movable contact assembly of claim 9, wherein the movable contact has substantially a dome shape.

11. The movable contact assembly of claim 9, wherein
the material sheet has a second slit portion including a second slit having substantially a strip shape provided therein, the second slit being provided around the second illumination portion, the second slit having a third edge and a fourth edge opposite to the third edge, the third edge facing the second illumination portion,
the second slit has an end facing the first slit, and
the material sheet includes a light blocker (216A) having a portion which extends from the end of the second slit and which extends beyond the bridge.

12. The movable contact assembly of claim 9, wherein at least one of the first slits has an L-shape.

13. The movable contact assembly of claim 9, further comprising materials (501A) filling the first slits, the materials absorbing light.

14. The movable contact assembly of claim 9, further comprising materials (501B) applied on edges of the first slits, the materials absorbing light.

15. The movable contact assembly of claim 9, wherein the portion of said another of the two or more first slits and the second portion of said one of the two or more first slits extend in the certain direction.

16. The movable contact assembly of claim 9, wherein the first portion of said one of the two or more first slits and the portion of said another of the two or more first slits extending from the end of said another of the two or more first slits in parallel to the second portion of said one of the two or more first slits extends on a straight line.

17. The movable contact assembly of claim 9, wherein said another of the two or more first slits has a substantially squared U-shape.

* * * * *